United States Patent [19]

Palmer et al.

[11] Patent Number: 4,503,925

[45] Date of Patent: Mar. 12, 1985

[54] DETACHABLE STEERABLE POWER UNIT FOR OCCUPANT-PROPELLED WHEELCHAIRS

[75] Inventors: James A. Palmer, Saginaw; Stephen C. Gromak, Auburn, both of Mich.

[73] Assignee: Amigo Sales, Inc., Bridgeport, Mich.

[21] Appl. No.: 503,524

[22] Filed: Jun. 13, 1983

[51] Int. Cl.[3] .......................... A61G 5/04; B60K 1/00

[52] U.S. Cl. .............................................. 180/13

[58] Field of Search .................. 180/13, 15, 65.6, 11, 180/12, 214, 6.5

[56] References Cited

U.S. PATENT DOCUMENTS

| | | | |
|---|---|---|---|
| 678,122 | 7/1901 | Maxham et al. | 180/12 |
| 1,565,719 | 12/1925 | Dunkley | 180/11 |
| 2,448,992 | 9/1948 | Love et al. | 180/23 |
| 2,468,801 | 5/1949 | Beall | 180/214 |
| 2,495,573 | 1/1950 | Duke | 180/11 |
| 2,635,703 | 4/1953 | Goeller | 180/13 |
| 2,649,309 | 6/1951 | Deissner | 180/13 |
| 2,710,659 | 6/1955 | Moederle | 180/11 |
| 2,919,756 | 1/1960 | Knipe | 180/11 |
| 2,978,053 | 4/1961 | Schmidt | 180/12 |
| 2,993,550 | 7/1961 | Klappert | 180/15 |
| 3,100,547 | 8/1963 | Rosenthal | 180/6.5 |
| 3,387,681 | 6/1968 | Rabjohn | 180/13 |
| 3,794,132 | 2/1974 | Moon | 180/13 |
| 3,905,437 | 9/1975 | Kaiho et al. | 180/15 |
| 3,912,032 | 10/1975 | Benz et al. | 180/13 |
| 3,921,774 | 11/1975 | Benoit et al. | 192/85 CA |
| 3,930,551 | 1/1976 | Cragg | 180/6.5 R |

FOREIGN PATENT DOCUMENTS

| | | |
|---|---|---|
| 1475405 | 2/1967 | France . |
| 1540324 | 8/1968 | France . |
| 1087225 | 10/1967 | United Kingdom . |
| 1401961 | 8/1975 | United Kingdom . |

*Primary Examiner*—Richard A. Bertsch

*Attorney, Agent, or Firm*—Learman & McCulloch

[57] ABSTRACT

A steerable motorized power unit is constructed for detachable coupling to a conventional occupant propelled wheelchair in a manner such that it can be easily and conveniently coupled to, or uncoupled from, the chair by the occupant. Coupling pins are provided with mounting plates which can be fixedly clamped to the tubular chair frame at a selected position without requiring any modification to the frame and without interfering with the normal operation of the chair.

14 Claims, 6 Drawing Figures

DETACHABLE STEERABLE POWER UNIT FOR OCCUPANT-PROPELLED WHEELCHAIRS

BACKGROUND OF THE INVENTION

The present invention is especially directed to a motorized power unit which may be coupled to a conventional occupant-propelled type wheelchair to motorize the chair when desired, and which may be readily uncoupled from the chair when not needed.

Detachable units of this type have been proposed in the prior art, examples of such units being disclosed in Benoit et al U.S. Pat. No. 3,921,744, Deissner U.S. Pat. No. 2,649,309, and Benz et al U.S. Pat. No. 3,912,032. However, most prior art devices, including the power unit of the aforementioned Benoit et al patent, require permanent modifications of the wheelchair to which the power unit is to be coupled, these modifications in some instances amounting to a major reconstruction of the wheelchair frame.

The present invention is especially directed to a power unit which may be readily coupled and uncoupled to and from most models of conventional occupant-propelled wheelchairs by the occupant, and which requires no modification of the wheelchair frame.

SUMMARY OF THE INVENTION

In accordance with the present invention, the mechanism for mounting or coupling the power unit to the wheelchair takes the form of a pair of coupling brackets which may be clamped to the tubular frame members of the wheelchair by means of U bolts which pass around the tubular frame member and clamp the coupling brackets in fixed position upon the chair frame. This manner of mounting accommodates the mounting brackets to nearly all models of conventional occupant-propelled wheelchairs in that the brackets may be mounted on convenient frame members. One salient requirement of the installation is that the coupling pins carried by the brackets end up in a horizontal position above the front wheels of the chair. One coupling bracket is mounted at each side of the chair with the coupling pins in coaxial alignment with each other.

The power unit itself includes a fixed frame upon which a single, steerable, power-driven wheel is mounted. The fixed frame of the power unit includes a pair of rearwardly extending handles which may be grasped by the occupant of the wheelchair to couple or uncouple the power unit. Near its rearward end, each handle carries a channel member having a downwardly opening recess which is adapted to receive the coupling pin mounted upon the wheelchair. A manually operable latch on each handle is employed to lock the handles of the power unit to the coupling pins on the wheelchair, while permitting the fixed frame of the power unit to pivot relative to the wheelchair about the horizontal axis of the coupling pins.

The fixed frame of the power unit includes a front bumper which, when rested on the ground, provides a stable support for the uncoupled power unit in a forwardly tilted position in which the handles on the fixed frame are necessarily approximately at the level of the arms of a conventional wheelchair so that they may be readily grasped by the occupant of the wheelchair when coupling or uncoupling the unit.

Other objects and features of the invention will become apparent by reference to the following specification and to the drawings.

IN THE DRAWINGS

Figure 1:
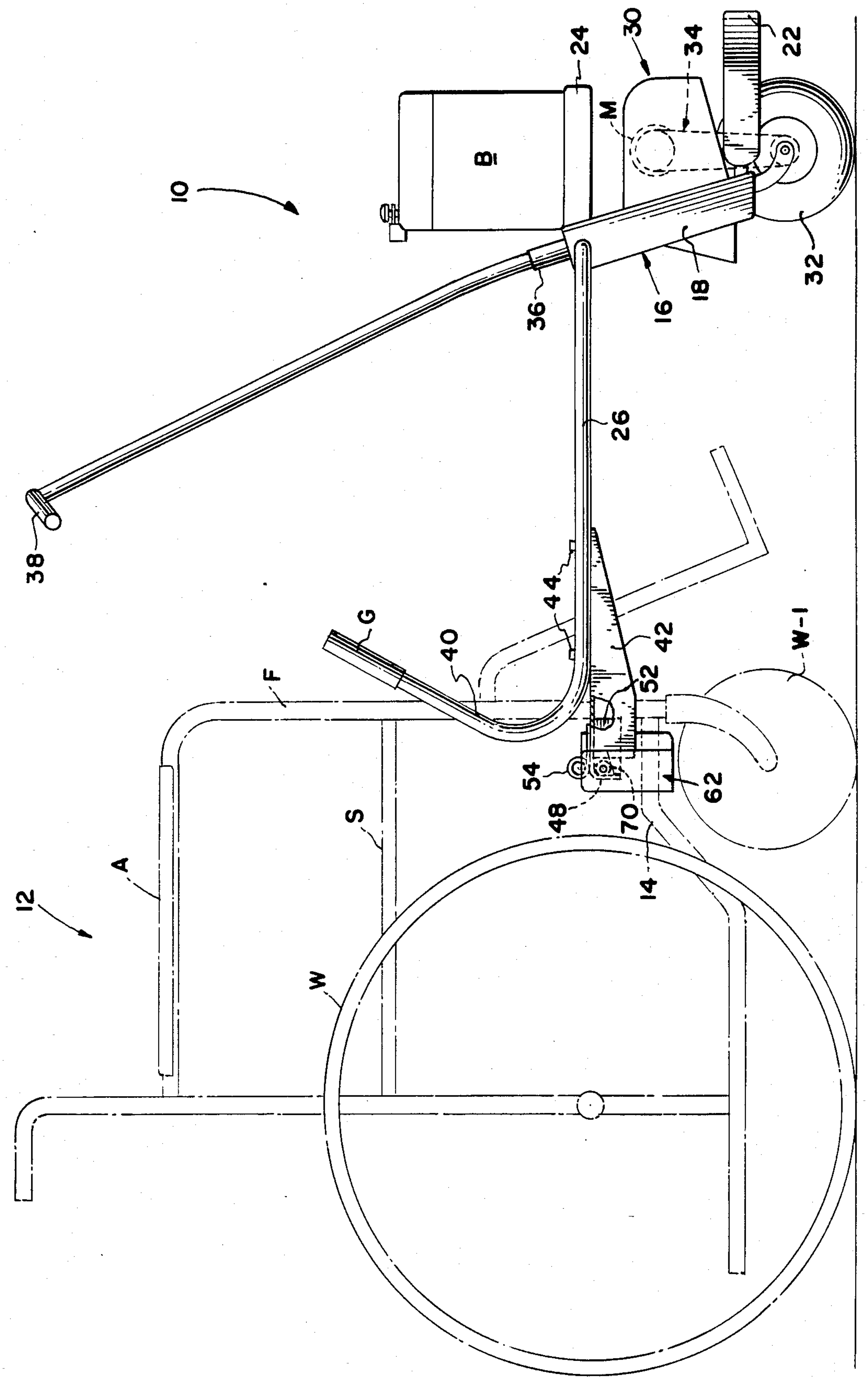
FIG. 1 is a side elevational view of a power unit embodying the present invention, coupled to a conventional wheelchair.
Figure 2:
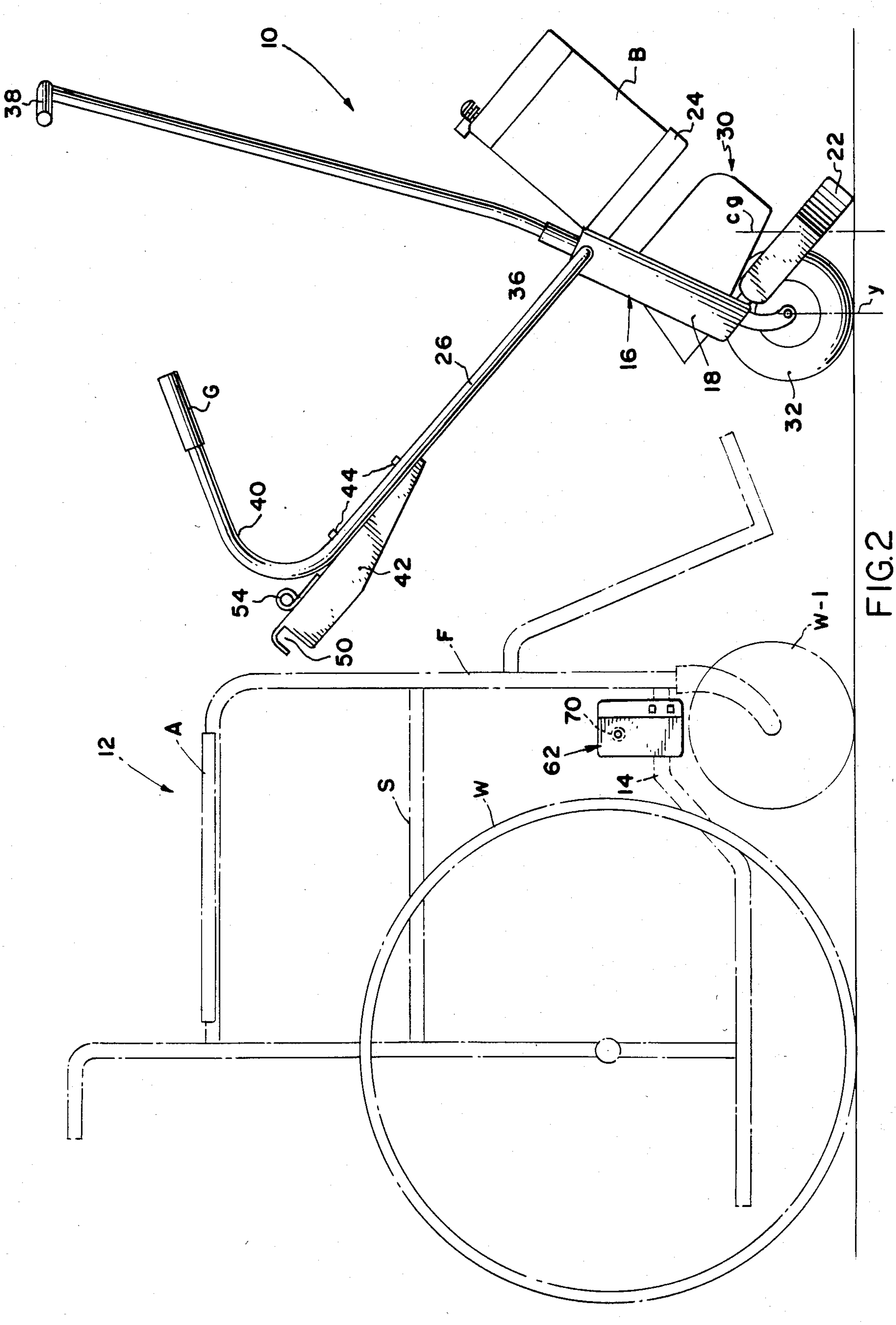
FIG. 2 is a side elevational view of the power unit, uncoupled from a conventional wheelchair.

In FIGS. 1 and 2, a power unit, designated generally 10, is shown respectively coupled to, and uncoupled from, a wheelchair designated generally 12. Wheelchair 12 is of conventional construction and may take the form of any of several commercially available, occupant-propelled wheelchairs. Such chairs are almost invariably constructed with a pair of side frames F, made up of tubular metal elements such as 14, supported by large side wheels W and castered side wheels W-1, the side frames being spanned by a seat S and having arm rests A.

Figure 3:
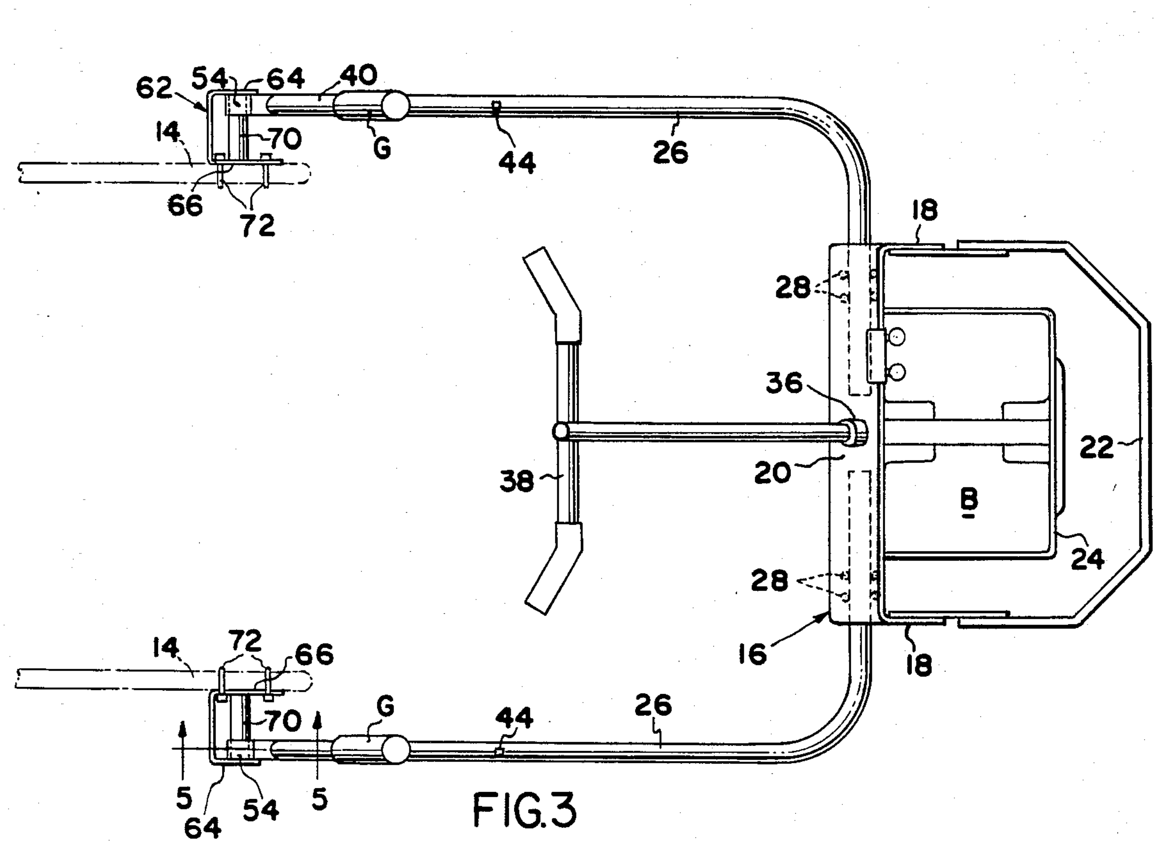
FIG. 3 is a top plan view of the power unit and coupling brackets.
Figure 4:
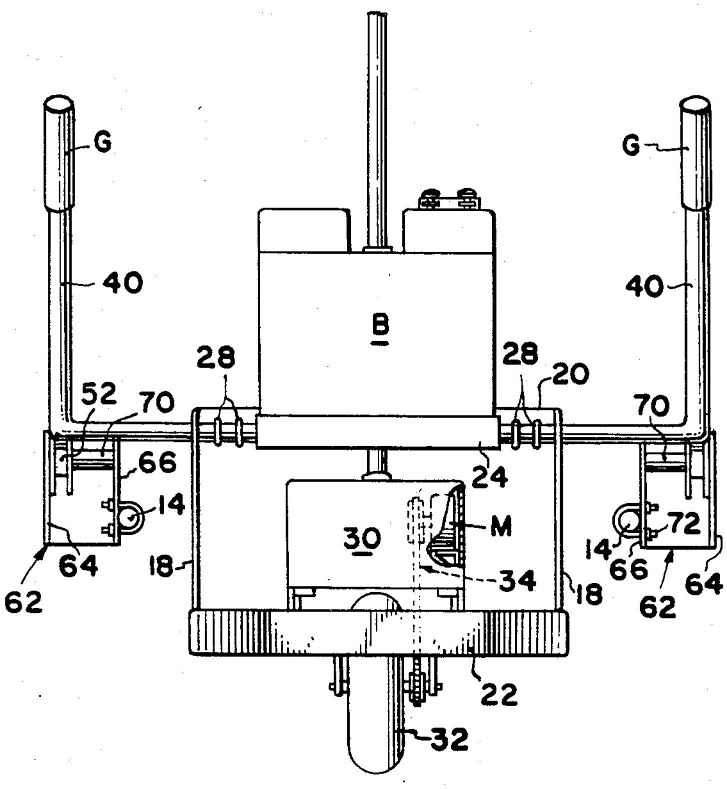
FIG. 4 is a front elevational view of the power unit and brackets with certain parts broken away.

Power unit 10 includes a fixed frame designated generally 16 which, as best seen in FIGS. 3 and 4, includes a pair of vertical side frame members 18, a top cross frame member 20 and a front bumper 22, all of these last elements being fixedly and rigidly secured to each other. A battery supporting tray 24 is fixedly mounted upon top cross frame member 20 to support an electric battery B.

The fixed frame of the power unit also includes two handle units 26 which, apart from being right and left-handed, are of identical construction. Handle units 26 are of tubular metal construction and are fixedly clamped to the underside of the top cross frame member 20 by U bolts 28, this particular interconnection enabling the transverse spacing between the tube handle units 26 to be adjusted as required by the width of the wheelchair to which the unit is to be coupled.

A motor-driven wheel assembly, designated generally 30, is steerably mounted upon fixed frame 16, the unit 30 including an electric motor M, powered by battery B. Preferably, this motor, not shown in detail, is a variable speed, reversible motor of conventional construction which drives the wheel 32 in rotation via a belt and pulley or chain and sprocket drive indicated at 34. Unit 30 may be steered by a steering column 36 in a conventional manner, and suitable motor controls, not shown, of conventional construction may be located on the handlebar 38 fixed to the top of steering column 36.

Referring now particularly to FIGS. 1 and 2, it is seen that the rearward ends of handle units 26 are bent upwardly and forwardly as at 40 and provided with handle grips G disposed laterally adjacent to frames F at a predetermined level relative to portions 26. At the rearward end of each handle member 26, below the upwardly projecting portions 40, a channel-shaped bracket 42 is fixedly mounted to the underside of handle 26 as by bolts 44 to project rearwardly from the handle. Channel members 42 are of an inverted U-shaped cross section with vertically extending side walls 42a (FIGS.

Figure 5:
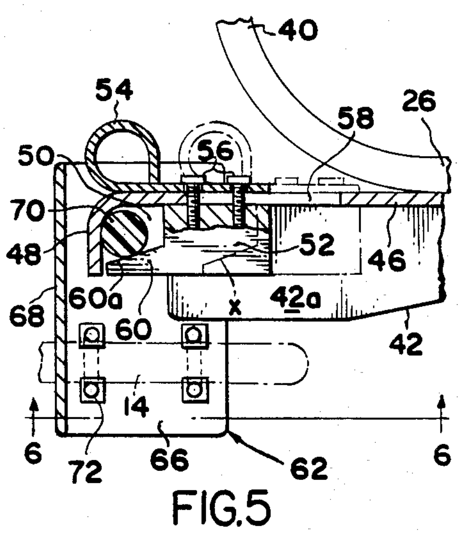
FIG. 5 is a detail cross-sectional view on an enlarged scale, taken on the line 5—5 of FIG. 3.

4, 5 and 6) integrally joined by a generally horizontal upper wall 46 (FIG. 5). As best seen in FIG. 5, upper wall 46 of channel-shaped member 42 is extended beyond the rearward ends of side walls 42a and bent downwardly as at 48 to form a downwardly opening recess 50 (see particularly FIG. 2) at the rearward end of each channel-shaped member 42.

Referring particularly to FIG. 5, a latch member 52, of nylon or another suitable material, is slidably mounted between the opposed side walls 42a of each member 42. A manually operated latch actuator 54 is slidably mounted on top of upper web 46 and is coupled to latch member 52 by a pair of bolts 56 which pass downwardly through a slot 58 in upper web 46. Latch member 52 has a rearwardly projecting tongue 60 with an inclined wedge face 60a. Latch tongue 60 may be selectively positioned to extend across the lower end of recess 50, as shown in full line in FIG. 5, or alternatively may be moved to the left from the full line position of FIG. 5 to the broken line position x clear of recess 50. The recess and latch are employed to couple power unit 10 to coupling brackets, designated generally 62, mounted on wheelchair 12.

Figure 6:
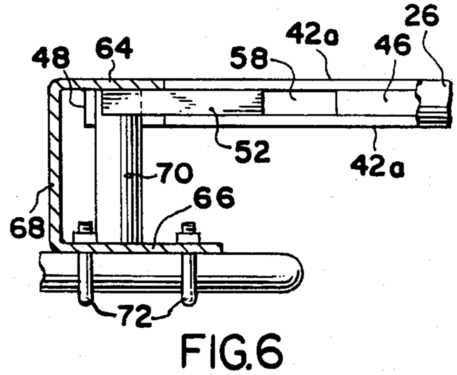
FIG. 6 is a similarly enlarged detail cross-sectional view, taken on the line 6—6 of FIG. 5.

Coupling brackets 62 consist of a channel-shaped member having a pair of side webs 64, 66 (FIG. 6) which are integrally connected by a cross web 68. A rigid coupling pin 70 (of nylon or another suitable material) is fixedly secured to, and extends between, the opposed side webs 64, 66. Brackets 62 are mounted, in a semi-permanent manner, upon suitably located frame members 14 of the wheelchair 12, to locate the coupling pins 70 in horizontal coaxial alignment with each other at opposite sides of the chair. Brackets 62 may be secured to the tubular frame members 14 of the wheelchair by U-bolts 72, it being apparent that this manner of mounting will enable the brackets 62 to be mounted either to a horizontal wheelchair frame member as shown, or to a vertical member, as long as the coupling pin 70 is accessible from above either through one end, or the open side, of the channel-shaped bracket 62. For example, it is believed apparent that the brackets 62, as shown in FIG. 2, could equally well be mounted upon the vertical frame member of the wheelchair with pins 70 being located in substantially the same position as shown in FIG. 2.

In FIG. 2, power unit 10 is shown in an uncoupled, vertically tilted, stored position in which the unit is stably supported by wheel 22 and the engagement of bumper 22 with the floor. When in this position, it will be noted that the upwardly bent portions 40 of handle units 26 are at approximately the same level as that of the armrests A of the wheelchair 12, and it is believed apparent that a handicapped person seated in wheelchair 12 who may not be able to bend from the waist can grasp the portions 40 of handles 26 with very little effort. In this position, the center of gravity c.g., instead of lying substantially in a vertical plane y through the wheel axis is disposed forwardly thereof, as shown in FIG. 2, and it is the offset weight of battery B, in this position, which is responsible for this.

To couple unit 10 to the wheelchair, the latch actuators 54 are pushed to their forward position so that the latch tongues 60 are withdrawn clear of recesses 50, as indicated in FIG. 2. The occupant of the wheelchair then positions the chair in alignment with power unit 10 and by grasping the two handle portions 40, the occupant lowers the rear or left-hand end of the power unit frame downwardly until coupling pins 70 on the wheelchair are seated in the pin-receiving recesses 50. Latch actuators 54 are then pulled rearwardly by the occupant to move the latch tongues 60 to the position shown in FIG. 5 in which the coupling pins 70 are trapped within the coupling recesses 50 on the power unit.

Uncoupling of the unit is accomplished by reversal of the foregoing procedure.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

What is claimed is:

1. In a steerable power drive unit adapted to be detachably coupled to a conventional, occupant-propelled, wheelchair having a pair of spaced frame portions adjacent the front of said chair at opposite sides thereof; said power drive unit having a main frame, a steerable ground engaging wheel operatively mounted in said main frame, power drive means for driving said wheel in rotation, and coupling means for detachably coupling said unit to said chair; the improvement wherein said coupling means comprises a pair of coupling pins, mounting means for mounting said pins upon the respective aforementioned frame portions of a wheelchair to locate said pins in laterally coaxial horizontal alignment with each other at opposite sides of the chair, a pair of longitudinally extending side frame members fixedly mounted at their forward ends upon said main frame of said power unit and projecting rearwardly therefrom, handle means projecting upwardly from the rearward end of each of said side frame members, means defining a downwardly opening pin receiving recess on each side frame member adjacent the rearward end thereof, and releasable latch means on each side frame member movable from a retracted position clear of the recess on said member to a latching position extending across the lower end of said recess wherein said latch means is operable to retain one of said coupling pins within the recess.

2. The invention defined in claim 1 wherein said means defining said recess comprises a channel-shaped bracket having a pair of spaced side walls rigidly interconnected by a top wall, means for fixedly mounting said bracket upon the underside of said side frame member at the rearward end thereof, said top wall of said bracket extending rearwardly beyond the rearward edges of said side walls and then downwardly in rearwardly spaced relationship to said edges to define said recess, said latch means including a latch member slidably mounted between said side walls of said bracket, and a latch tongue on said latch member adapted to project rearwardly from said side walls substantially entirely across the lower end of said recess when said latch means is in said latching position.

3. The invention defined in claim 2 further comprising a latch actuator slidably mounted on the top of said top wall, means defining an elongate slot through said top wall, and fastening means projecting through said slot for fixedly fastening said latch actuator to said latch member.

4. The invention defined in claim 1 further comprising a forwardly projecting transversely extending bumper fixedly mounted on said main frame adapted in combination with said wheel to stably support said drive unit upon a flat surface with said drive unit in a forwardly tilted position wherein said handle means is at an elevation such that it may be readily grasped by a person seated in a conventional wheelchair.

5. For use in combination with an occupant propelled wheelchair of the type having a pair of relatively large manually rotatable rear wheels and a pair of relatively small front wheels mounted on a chair frame and wherein the chair frame has a pair of spaced side frame portions adjacent the front of the chair at opposite sides thereof: a pair of cylindrical coupling pins, mounting means for fixedly mounting said pins on the respective side frame portions of said chair with said pins in alignment with each other along a horizontal axis parallel to the axis of rotation of said rear wheels, a steerable power unit having a main frame, power driven steerable ground engaging wheel means mounted on said main frame, a pair of side frame members fixedly mounted on said main frame and projecting rearwardly therefrom in symmetrical transversely spaced relationship, a pair of coupling brackets respectively mounted on the rearward end of each side frame member and each having a downwardly opening recess therein, said recesses in said coupling brackets being adapted to receive said coupling pins to couple said main frame of said power unit to said chair, and releasable latch means on said coupling brackets for retaining said coupling pins in said recesses while accommodating pivotal movement of said power unit relative to said chair about said horizontal axis.

6. The invention defined in claim 5 wherein said side frame members each comprise a tubular member extending substantially horizontally from said main frame to said bracket when said coupling pin is received therein, said tubular member being bent upwardly from said bracket to define a handle on each side frame member to enable an occupant of the chair to manipulate said power unit into and out of coupled relationship with said chair.

7. The invention defined in claim 6 wherein said chair has arms thereon at an elevation above said large wheels and said power unit further comprising bumper means on the front of said main frame cooperable with said wheel means to stably support said power unit, when uncoupled from said chair, in a forwardly tilted position wherein said handles are at an elevation approximately the same as the arms of said chair.

8. The invention defined in claim 6 wherein said brackets project rearwardly from the horizontal portion of said tubular member and said recess in said bracket is located adjacent the rearward end of said bracket, said latch means including a manually operable latch actuator at the top of said bracket rearwardly of said tubular member.

9. The invention defined in claim 5 wherein said frame of said chair is of tubular construction and said mounting means comprises a mounting plate fixedly secured to said coupling pin, and means for clamping said plate to the tubular frame of said chair at a selected position thereon.

10. In a steerable power drive unit adapted to be detachably coupled in longitudinally disposed tandem traveling position to a conventional occupant-propelled, wheelchair having a pair of spaced frame portions adjacent the front of said chair at opposite sides thereof; said power drive unit having a main frame, a steerable ground engaging wheel operatively journaled by said main frame, power drive means for driving said wheel in rotation, and coupling means for detachably coupling said unit to said chair; the improvement wherein, a wheel protecting assembly projects forwardly on said main frame beyond the wheel sufficiently to provide a ground engaging portion forwardly of said wheel when the frame is in vertically tilted position; the weight of said main frame being so distributed that the center of gravity of the frame is forwardly of the vertical plane through the wheel axis when the frame is tilted to engage the ground engaging portion with the ground, and the ground engaging portion and the wheel will support the main frame at an upwardly tilted angle; a pair of longitudinally extending side frame members are fixedly mounted at their forward ends upon said main frame of said power unit and projecting rearwardly therefrom; handle means projects upwardly from the rearward ends of said side frame members sufficiently to be substantially at the hand level of a wheelchair occupant when the main frame is in said tilted position; and coupling means on the main frame engageable to couple to the wheelchair when the handle means are grasped and the main frame is swung down to said traveling position from said upwardly tilted position.

11. The invention of claim 10 wherein the wheel protecting assembly includes a wheel enveloping bumper fixed to said main frame.

12. The invention of claim 11 wherein a battery support tray is fixed on said main frame to extend longitudinally forwardly thereof and a battery is provided thereon substantially centered over said wheel axis when the unit is in traveling position, but has its weight forwardly of a vertical plane through the wheel axis when the unit is in upwardly inclined position.

13. The invention of claim 12 wherein said coupling means includes a downwardly opening hook shaped member secured to said side frame members below and adjacent said handle means.

14. The invention of claim 13 wherein latch means carried by said coupling means is movable to and from a position closing the open sides of said hook shaped members.

* * * * *